April 9, 1963　　　G. GUANELLA　　　3,085,161
DEVICE FOR PRODUCING AN IMPULSE SEQUENCE IN DEPENDENCE
ON THE VARIATION OF A PRIMARY CURRENT
Filed Aug. 12, 1958　　　　　　　　　　　　4 Sheets-Sheet 1
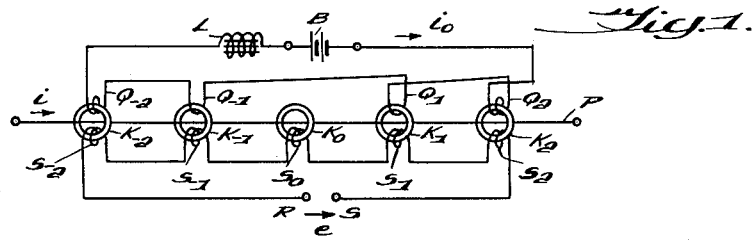
Fig.1.
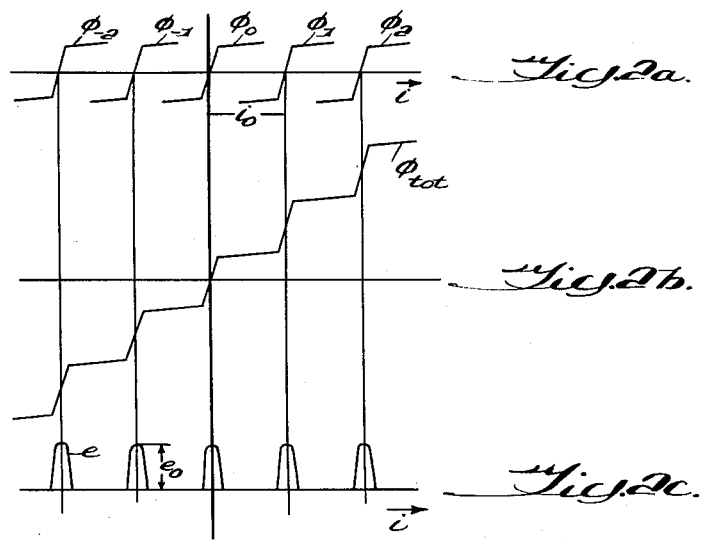
Fig.2a.
Fig.2b.
Fig.2c.
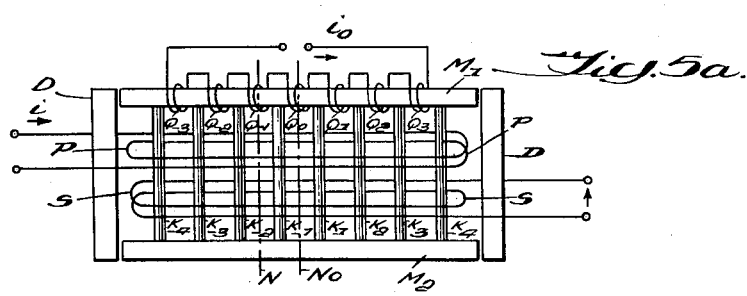
Fig.3a.
INVENTOR
Gustav Guanella,
BY Pierce, Scheffler & Parker
his ATTORNEYS INVENTOR
Gustav Guanella,
BY Pierce, Scheffler & Parker
his ATTORNEYS

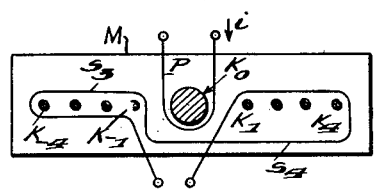
Fig. 6c.
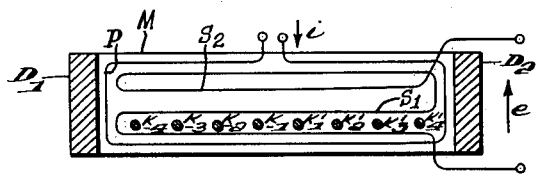
Fig. 6d.
Fig. 7.
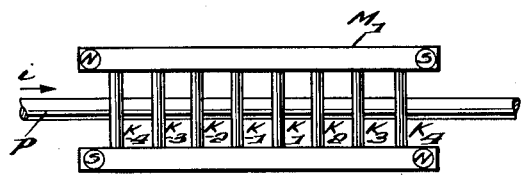
Fig. 8a.
Fig. 8b.
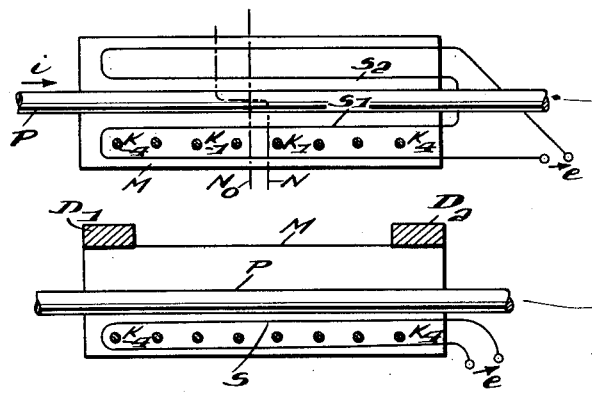
Fig. 8c.

April 9, 1963   G. GUANELLA   3,085,161
DEVICE FOR PRODUCING AN IMPULSE SEQUENCE IN DEPENDENCE
ON THE VARIATION OF A PRIMARY CURRENT
Filed Aug. 12, 1958   4 Sheets-Sheet 4

INVENTOR
Gustav Guanella,
BY Pierce, Scheffler & Parker
his ATTORNEYS

United States Patent Office 3,085,161
Patented Apr. 9, 1963

3,085,161
DEVICE FOR PRODUCING AN IMPULSE SEQUENCE IN DEPENDENCE ON THE VARIATION OF A PRIMARY CURRENT
Gustav Guanella, Zurich, Switzerland, assignor to Aktiengesellschaft Brown, Boveri & Cie, Baden, Switzerland, a company of Switzerland
Filed Aug. 12, 1958, Ser. No. 754,611
Claims priority, application Switzerland Aug. 15, 1957
7 Claims. (Cl. 307—88)

The present invention relates to the art of measuring electric currents and is more particularly concerned with apparatus for producing a measurable impulse sequence in dependence on the variation of a primary current.

Devices for measuring and telemetering electric currents are known, the same being characterized in that a sequence of impulses is produced whose repetition frequency is proportional to the respective current intensity. These devices contain amplifier tubes or transistors whose operation requires a special current source. Influences of temperature, operating conditions, and the like, generally have an adverse effect on the obtainable accuracy, and the safety of the relatively complicated devices is limited.

These disadvantages are avoided in the suggested invention. The invention concerns an apparatus for producing an impulse sequence in dependence on the variation of a primary current. The invention consists essentially in that several highly permeable, differently magnetized magnet cores are provided where at least the magnetization of some cores is reversed by the primary current so that the variation of the primary current induces, in at least one secondary winding voltage, impulses whose number corresponds to the sum of the flux variations in the magnet cores.

The invention will be explained more fully with regard to the accompanying drawings in which:

FIG. 1 is a schematic diagram of one embodiment of the invention utilizing annular magnetic cores;

FIGS. 2a–2c are flux and voltage versus time curves illustrating the operation of the embodiment of FIG. 1 for an increasing direct-current primary current;

FIG. 5a illustrates schematically a yoke and multiple core embodiment of the invention;

Figure 6A:
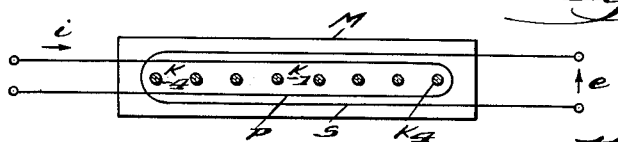
FIG. 6a is another illustration of the embodiments of FIGS. 5a and 5b.
Figure 6B:
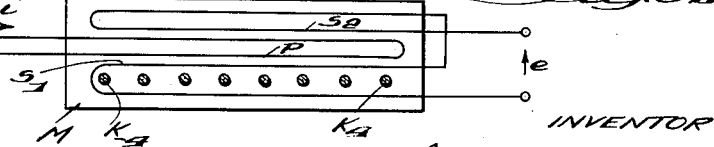
FIG. 6b is a modification of FIG. 6a having means for suppressing the stray flux.
Figure 6B:
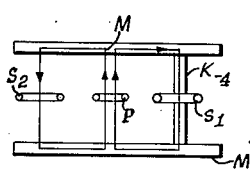
Figure 9A:
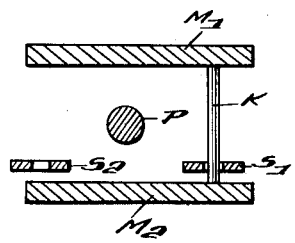
Figure 9B:
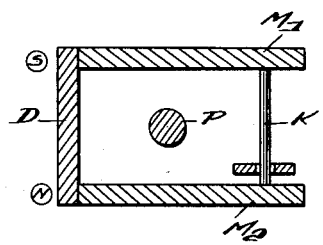

FIG. 6b' is a view in end elevation of the arrangement according to 6b as seen from the left.

Figure 5B:
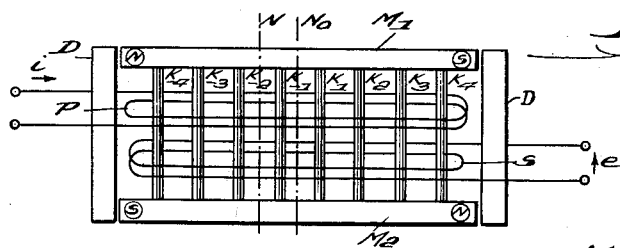
FIG. 5b is a modification of the embodiment of FIG. 5a wherein two of the yoke parts are permanent magnets.
Figure 10:
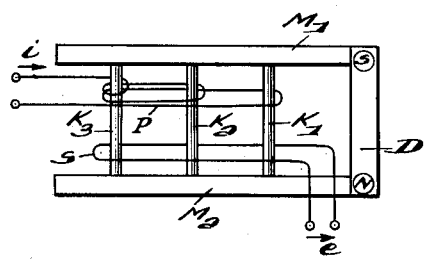
Figure 11:
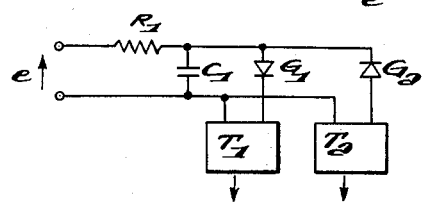
Figure 12:
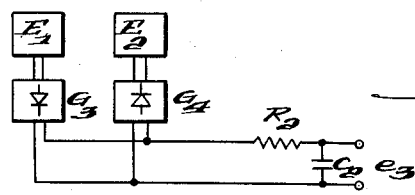
Figure 13:
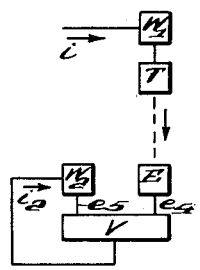

FIG. 6c is a modification for suppressing stray flux with the use of an additional center core;

FIG. 6d illustrates means for closing the yoke magnetic circuit and also includes means for suppressing stray flux;

FIG. 7 illustrates an embodiment of the invention similar to that of FIG. 5b having a linear primary conductor;

FIGS. 8a–8c, 9a and 9b illustrate schematically various modifications of the embodiments of FIG. 7;

FIG. 10 illustrates an arrangement wherein the field strength of the additional magnetic field at the individual cores is equal;

FIGS. 11 and 12 illustrate diagrammatically means for transmitting and receiving, respectively, high frequency impulses; and FIG. 13 illustrates means for evaluating the impulse sequence on the receiver side.

FIG. 1 shows a device with five magnet cores. P is a conductor through which flows a primary current to be measured. This conductor is enclosed by five annular magnet cores $K_{-2}$, $K_{-1}$, $K_0$, $K_1$ and $K_2$. The cores consist of highly permeable material and have a generally rectangular magnetization curve. On the five cores are provided bias windings $Q_{-2} \ldots Q_2$. The biasing of the cores is graduated. The number of turns of $Q_{-2}$ is greater than the number of turns of $Q_{-1}$. The core $K_0$ has no bias winding at all. The cores $K_1$ and $K_2$ have bias windings with a rising number of turns, these windings being also wound in opposite sense to that of the windings $Q_{-2}$ and $Q_{-1}$. The bias windings are connected in series. It is readily understandable that a graduated magnetization is achieved by these windings of the individual cores. The five individual cores are also provided with secondary windings $S_{-2} \ldots S_2$. During the reversal of the magnetization of the various cores voltage impulses are induced in these secondary windings. The secondary windings are connected in series, so that impulse voltages appear successively at the terminals R—S. A certain number of these impulse voltages are positively directed, and the corresponding subsequent voltages are negatively directed. The feeding of the exciting windings is effected from the battery B through a choke coil L. This choke coil has the function of making the coupling of the individual cores over the bias circuit negligibly small.

The method of operation of the device is as follows:

Through the conductor P flows the primary current "$i$" to be measured. This current is principally a varying current. In practice an alternating current is used primarily. At the same time a biased exciting current "$i_0$" flows through the windings $Q_{-2} \ldots Q_2$ (it being remembered that the number of winding turns are graduated on either side of $K_0$ and that coils $Q_1$ and $Q_2$ are wound oppositely to the winding of coils $Q_{-2}$ and $Q_{-1}$). Due to this biasing, the individual cores are differently magnetized. In cooperation with the current "$i$" to be measured, which is at first assumed to be an increasing direct current, the magnetization of the individual cores is effected at different gradually increasing current values. This process is represented in FIG. 2a. The magnetization curves $\phi_{-2} \ldots \phi_2$ show the course of the magnetic flux in the individual cores at different current values. The course in time of the sum $\phi_{tot.}$ of the individual fluxes in all cores corresponds to the course in FIG. 2b. In the secondary windings $S_{-2} \ldots S_2$, which have the same number of turns and which are connected in series, an output voltage "$e$" is formed, which output voltage is proportional to the time derivation of $\phi_{tot.}$. This voltage has a course as shown in FIG. 2c, when the primary current increases uniformly with the time. The steeper the rise of the current, the closer are the voltage impulses in time. The time variation of the current "$i$" is inversely proportional to the time interval $t_0$ between two adjoining voltage impulses. This gives $$\frac{di}{dt} = K \cdot \frac{1}{t_0}$$

where "$K$" is a proportionality constant.

Figure 3:
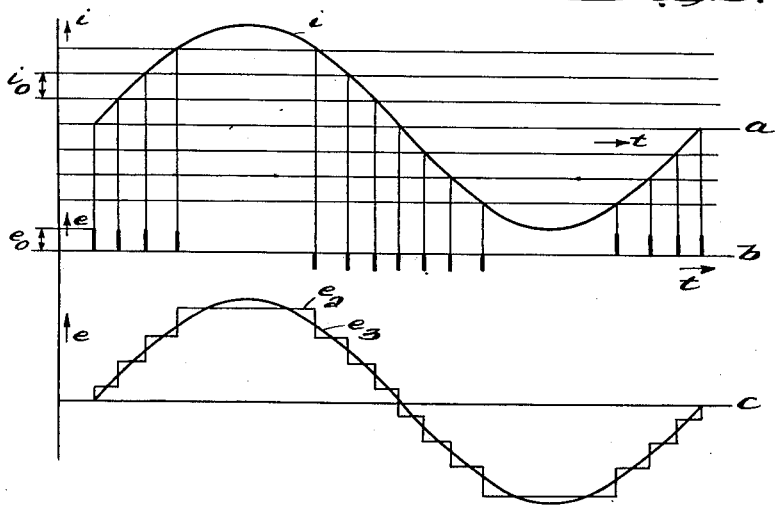
FIGS. 3a–3c are current and voltage versus time curves illustrating the operation of the device with a sinusoidal alternating-current primary current.

Of particular practical interest is the case where the primary current $i$ is an alternating current with sinusoidal variation. The method of operation in this case is represented in FIGS. 3a, 3b, 3c. In this sinusoidal current variation according to FIG. 3, a sequence of positive and negative voltage impulses is formed at the output terminal of the series-connected secondary windings according to FIG. 3b. These positive and negative impulses have equal amplitudes. A measure for the current to be measured is given by the number of impulses per unit of time. If the voltage impulses are fed to a device which permits a time summation of these impulses with consideration of the direction of voltage, a resultant voltage "$e_2$" with a stepped course is formed according to FIG. 3c. If this voltage is conducted further over smoothing means, the part varying by leaps is suppressed and a voltage "$e_3$" is formed which is proportional to the original course of the current "$i$."

By reversing the polarity of the secondary windings in the cores with negative additional excitation, corresponding reversed voltage impulses are formed in these windings. Instead of the output voltages "$e_2$" and "$e_3$," respectively, shown in FIG. 3, one then obtains the output voltages "$e_2$" and "$e_3$," respectively, shown in FIG. 4, which latter thus represent a measure for the absolute value of the respective primary current.

It is readily understandable that the variation of the primary current "$i$" between the individual voltage impulses corresponds to the exciting current "$i_0$." The sensitivity and the measuring range, respectively, of the entire arrangement can thus be adjusted by corresponding selection of the exciting current "$i_0$." On the other hand, time variations of the exciting current can naturally influence the attainable accuracy of the impulse sequence which depends on the primary current.

Instead of the individual annular cores with separate windings according to FIG. 1, there can also be provided an arrangement according to FIG. 5a where eight individual cores $K_{-4}$ . . . $K_4$ are assembled in connection with the yoke parts $M_1$, $M_2$ to constitute a unit wherein at least one part of the windings is common for several cores. The magnetic circuit at the ends of the yoke parts $M_1$ and $M_2$ is completed through the air or through yoke pieces D. The primary and secondary windings P, S together enclose the various magnet cores. In order to produce an unequal additional excitation of the various cores, windings $Q_{-3}$ . . . $Q_{+3}$ traversed, for example, by the exciting current "$i_0$," are provided on a yoke, e.g., yoke part $M_1$. When the primary current "$i$" is introduced in the primary winding P, which is common for all cores, the magnetic field between $M_1$ and $M_2$ equals zero in the zone $N_0$. For example, with a value of primary current $i_{-1}$, the magnetic field in the core $K_{-1}$ (which is formed both by the field caused by the excitation current $i_0$ and an additional field caused by the primary current) is exactly zero. In other words, the zero-field zone has been displaced to the left. With a further variation of the primary current the zero field zone is displaced further to the left, for example, to the section designated N. At the same time the magnetic field in core $K_{-1}$ has changed its sign, so that a corresponding change in flow appears in this core from the minimum to the maximum extreme value. This change in flow causes at the same time a corresponding voltage impulse $e$ in the secondary winding S enclosing all cores. With increasing primary current, the zero-field zone is displaced to the left, for example, so that it comes to lie at a certain moment in the zone indicated by N, for example. During this passage the magnetic field changes its sign at the highly permeable core $K_{-1}$, and the flux through this core jumps from the negative saturation value to the positive saturation value. At the same time, a corresponding impulse is formed at the output of the secondary winding S which encloses the cores.

A separate current source for the production of the additional exciting current "$i_0$" is frequently undesired. The additional magnetic field, which varies from core to core, can also be produced by means of permanent magnets by designing, for example, according to FIG. 5b at least one of the two yokes M1, M2, as a permanent magnet with the north and south poles indicated by the circles. By this expedient harmful influences of a time variation of an exciting current are avoided. Any undesired temperature influences on the permanent magnets can be compensated or eliminated to a great extent by measures which per se are known.

The arrangement of the cores $K_{-4}$ . . . $K_4$ and of the two windings P and S of the device shown in FIG. 5a and 5b, respectively, can also be effected according to FIG. 6a, for example. But it has to be kept in mind that the secondary winding S comprises, in addition to the effective flux appearing in the cores $K_{-4}$ . . . $K_{+4}$, a considerable stray flux which is independent of the state of saturation of these cores, so that the output voltage "$e$" contains, in addition to the desired impulses, an alternating voltage component which is amplitude-proportional to the primary current "$i$" and which is undesired under certain circumstances. This component can be suppressed to a great extent in an arrangement according to FIG. 6b, wherein two secondary windings S1, S2 are arranged symmetrically to the primary winding P, which comprise at least approximately the same stray flux. By connecting these coils in opposition the voltages induced by the stray flux are suppressed to a great extent. Only one of the two windings e.g. winding S1 is, however, magnetically linked with the cores $K_{-4}$, $K_{+4}$, so that the voltages caused by the magnetic flux of these cores appear unweakened at the output. The manner of suppression of the undesired alternating current component will become more clear by reference to FIG. 6b' which is an end view of FIG. 6b looking from the left. The primary winding P produces a magnetic flux having two paths indicated by the dash-dot lines and arrows. One path is through windings $S_2$ and P and the upper and lower premagnetized plates M. The other path is through windings $S_1$ and P and also the upper and lower plates M. This latter path also passes through the cores $K_{-4}$ to $K_4$. Following the arrows, it will be seen that the magnetic flux penetrates the two secondary windings $S_1$ and $S_2$ in a descending direction. In the illustrated coupling of the two secondary coil halves, therefore, the voltages produced therein cancel out each other if the fluxes are of the same magnitude in both coil halves. Since the additional flux through the cores $K_{-4}$ to $K_4$ is effective only in one half of the secondary winding, e.g. winding $S_1$, the voltage at the output of this winding depends solely on the flux in these cores, while the flux which passes through both secondary coil halves $S_1$ and $S_2$ remains without influence upon the output voltage, as the two coil halves $S_1$ and $S_2$ are connected in opposition. The difference from FIG. 6a thus is that in FIG. 6a both the primary winding and secondary winding surround the cores and hence, there is no compensation, and the output voltage of the secondary winding depends in that case not only on the flux in the individual cores but also on the additional stray flux which extends parallel to the cores in the air spaces between such cores. Instead of the arrangement of the primary coil P between the two secondary coils S1, S2, indicated in FIG. 6b, it is also possible to provide a primary coil which encloses both secondary coils.

Figure 4:
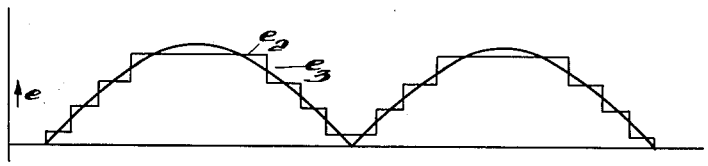
FIG. 4 is a voltage time curve which is caused by reversing the polarity of the secondary windings with negative additional excitation.

In the arrangement according to FIG. 6c, an additional center core $K_0$ is provided in the yoke magnetic circuit, upon which center core is arranged the primary coil P. Compensation of the stray voltages is achieved here by counterconnecting the secondary coils S3, S4 which enclose the cores $K_{-1}$, $K_{-4}$ and $K_1$, $K_4$ respectively. Since in this case the two secondary windings are connected in the opposite sense, the resulting output voltage impulses follow the course as shown in FIG. 4. More particularly, in FIG. 6c there is produced by the current $i$ in primary winding P a magnetic flux which flows, for example, in upward direction within this winding, i.e. in core $K_0$, and in a downward direction outside this winding. The two halves $S_3$ and $S_4$ of the secondary winding are interconnected in opposition such that the induced secondary voltages cancel out each other if one disregards the effect of cores $K_{-4}$ to $K_4$. These cores are arranged between the two pre-magnetized plates M which produce an additional magnetic flux along the cores. With increasing primary current, therefore, one core after the other switches between positive and negative saturation and there results a corresponding voltage pulse at the output terminals of the secondary windings $S_3$, $S_4$. As this flux variation does not occur simultaneously at two or more cores, the respective voltage pulses do not cancel out each other in the two winding halves $S_3$ and $S_4$.

In order to close the magnetic circuits, two ends each of the yoke magnets M1, M2 can, according to FIG. 6d, be closed magnetically by ferromagnetic connecting pieces $D_1$, $D_2$. Finally, these connecting pieces can also be designed as a magnetized core with exciting winding or a permanent magnet, while M1, M2 are made of a material with a lower coercive force (soft iron or ferrite). This solution has the advantage of a particularly uniform distribution of the magnetic potential over M1 and M2, which is not easy to obtain in permanent magnets, as known.

In FIG. 6d too, two counterconnected secondary windings S1, S2 are provided for the compensation of the voltages caused by stray flux, as in FIG. 6b. With large primary currents a single loop traversed by the primary current can be provided instead of the primary winding comprising several turns.

In the arrangement according to FIG. 7 the primary winding is replaced by a linear conductor traversed by the primary current "$i$." The magnetic field caused by this conductor has a strengthening and weakening effect, respectively, on the additional field of the permanent magnets M1, M2. More particularly, the magnetic flux produced by primary current $i$ passes one half $S_1$ of the secondary winding, for example, in a downward direction and the other half $S_2$ in an upward direction. This secondary winding can be as shown in FIG. 8a. Due to the series connection of these two winding halves, the voltages induced by this flux cancel each other out at the output of the secondary winding if one disregards the additional effect of the magnetic flux which passes through the cores $K_{-4}$ to $K_4$. However, since these cores are magnetically linked with only one half of the secondary winding, namely, winding half $S_1$, the effects of the flux in these cores do not cancel each other out, and hence, the output voltage depends solely on the flux variations in these cores. In the arrangement of the cores $K_{-4}$, $K_{+4}$, shown in FIG. 8a, the zero-field zone associated with the primary current "$i$"="0" is indicated by $N_0$. With increasing primary current, this zone is displaced, for example, to the position indicated by N, and again corresponding voltage impulses are formed at the output terminals for the polarization of individual cores. For the compensation of the voltages caused by the stray field there is provided, in addition to S1, a secondary winding S2 whose arrangement can be seen from FIG. 9a. In this embodiment the primary conductor P can be introduced laterally without displacing any parts, which is frequently of great advantage in practice. In the device according to FIG. 7 too, the magnetic circuit can be closed by additional oppositely magnetized cores D1, D2, which are arranged, for example, according to FIG. 8b and 9b along the long sides of the yoke parts M. These strips can again be designed as an electromagnet and permanent magnet respectively, while M1 and M2 consist of soft iron, for example.

According to FIG. 8c, a single perforated—or, a two-part—magnet core D can be provided at one end of the permanent magnets M1, M2, the small cores $K_1$-$K_8$ and $K_{-1}$-$K_{-8}$ respectively, being arranged at both sides of the exciting conductor P. Depending on the sign of the primary current, the zero-field zone is then in one or the other series of these cores and, when the primary current varies, corresponding voltage impulses appear again at the output of the series-connected secondary windings S1, S2. In the represented arrangement, the additional voltages produced by the stray flux compensate each other again, and the voltage impulses have the dependence on the primary current, shown in FIG. 4.

FIG. 10 shows an arrangement wherein the field strength of the additional magnetic field at the individual cores $K_1$-$K_3$ is equal. In this case it is achieved by unequal turns of the exciting winding over these cores so that the change of sign of the resulting magnetic field of the individual cores is effected with unequal exciting currents. The additional field is here produced, for example, by the laterally arranged permanent magnet D.

The duration and amplitude of the voltage impulses produced with the above described arrangements depend on the time variations of the primary current, with a very great change corresponding short impulses with a large amplitude are formed, while currents varying at a slower rate yield longer impulses with a smaller amplitude.

Since each impulse corresponds to a certain bias energy, the surface of the impulses remains at least approximately constant. For the further evaluation of the impulses a special formation is at first recommended: by transmission over an RC-member, short impulses are extended to a length corresponding to the time constant with simultaneous reduction of the amplitude. The time constant should not exceed substantially the duration of the longest impulses to be evaluated and an interval of the most rapidly appearing impulse sequence. Another formation is possible, if necessary, by limiting the amplitude and by transformation into impulses of constant duration by electronic means.

For transmission over greater distances the impulses can be transformed over high frequency transmitters into corresponding high frequency impulses. In the device according to FIG. 11 the impulses are first formed and extended respectively by the condenser $C_1$ and the series resistance $R_1$ to a uniform course. The positive impulses control a first transmitter $T_1$ over the rectifier $G_1$, while the negative impulses control a second transmitter $T_2$ ove rthe rectifier $G_2$. A separation of the positive and negative impulses on the receiver side is possible if the two transmitters work on different frequencies. Frequently only transmission over very short distances is required, so that very small sending powers are sufficient. In this case it is advisable to use small transistor generators as transmitters T1, T2, the feed of these generators being effected directly by the supplied impulses, so that no additional current sources are necessary.

The reception can be effected according to FIG. 12 with the receivers $E_1$, $E_2$ whose output voltages are rectified in $G_3$ and $G_4$ respectively to obtain the original positive and negative impulses.

Since the impulse repetition frequency is proportional to the time variation of the primary current, it is possible to obtain from the impulse series by an integrating network a voltage "$e_3$" which is proportional to the original current itself. This network is represented in FIG. 12 by a condenser $C_2$ in connection with a relatively high-ohmic charging resistance $R_2$. In view of the steadying effect of this network, the output voltage $e_3$ has the balanced course shown in FIGS. 3c and 4 respectively.

For the evaluation of the impulse sequence on the receiver side there can also be provided the arrangement according to FIG. 13, the converter for the production of the impulse sequence from the variable primary current "$i_1$" being designated at W1. The impulse sequence $e_4$, emitted by T and received by E, is fed to a reference device B whose output current "$i_2$" depends on the frequency difference between this impulse sequence and an additional impulse sequence "$e_5$," the impulse sequence "$e_5$" being obtained with an additional converter of the type from the current "$i_2$." One is thus dealing here with an automatic follower system where the current $i_2$ obtained on the receiver side is made at least approximately equal to "$i_1$." The difference between the two currents is the smaller the greater the slope of the reference circuit V, and an output current is selected which corresponds to the difference of the supplied number of impulses. In arrangements according to FIG. 13 it is also possible to use impulse converters with non-linear dependence of the impulse frequency on the exciting current. It is only necessary in this case that the two converters agree as far as possible in their characteristic. The reference circuit can also be designed, for example, as a meter, which determines continuously the difference of the supplied number of impulses. The current $i_2$ is in this case proportional, for example, to this differential quantity or to the time integral.

I claim:

1. Apparatus for measuring a current of varying magnitude flowing in a given direction through a primary conductor comprising a plurality of bar-shaped core elements arranged in parallel spaced relation intermediate two parallel spaced ferromagnetic yoke parts which engage the ends of said bar-shaped core elements, each of said core elements being of a highly permeable ferromagnetic material and having a substantially rectangular magnetization characteristic, means arranging said primary conductor in magnetic inductive relation with each of said core elements, means magnetically biasing said core elements in sequence to progressively different degrees of magnetization, and a secondary winding arranged in magnetic inductive relation with each of said core elements, said secondary winding having induced therein a succession of output voltage pulses corresponding respectively to the progressive changes in magnetization produced in said progressively magnetically biased core elements by the change in magnitude of the current flowing through said primary conductor, the change in magnetization of adjoining core elements producing output voltage pulses of the same polarity in said secondary winding.

2. Apparatus as defined in claim 1 wherein said means for biasing said core elements to progressively different degrees of magnetization are constituted by a plurality of biasing windings having progressively different numbers of turns arranged on one of said ferromagnetic yoke parts and located respectively between adjacent core elements.

3. Apparatus as defined in claim 1 wherein said means biasing said core elements to progressively different degrees of magnetization is constituted by arranging said parallel spaced ferromagnetic yoke parts as permanent magnets, like positioned ends of said ferromagnetic yoke parts being of opposite polarity.

4. Apparatus as defined in claim 1 wherein said means biasing said core elements to progressively different degrees of magnetization is constituted by arranging permanent magnets between the ends of said parallel spaced ferromagnetic yoke parts.

5. Apparatus as defined in claim 1 wherein said primary conductor is constituted by a linear conductor member extending parallel to and intermediate said yoke parts.

6. Apparatus as defined in claim 1 and which further includes an additional winding connected in series opposition with said secondary winding for reducing the influence of stray magnetic fields, said additional winding being arranged in non-inductive relation to said core elements.

7. Apparatus as defined in claim 1 and which further includes an additional bar-shaped core element located intermediate said parallel spaced yoke parts, said additional core element being located parallel to and arranged centrally with respect to said plurality of core elements and constituting an element of the magnetic circuit of said parallel spaced yoke parts, said primary conductor being constituted by a winding on said additional core element.

References Cited in the file of this patent

UNITED STATES PATENTS

| | | |
|---|---|---|
| 2,696,347 | Lo | Dec. 7, 1954 |
| 2,913,596 | Ogle | Nov. 17, 1959 |